United States Patent [19]

Michoux et al.

[11] Patent Number: 4,804,072
[45] Date of Patent: Feb. 14, 1989

[54] DRUM BRAKE WITH AUTOMATIC ADJUSTMENT LOCKED AT HIGH TEMPERATURE

[75] Inventors: Eric Michoux, Villiers-sur Marne; Michel Denree, Aulnay-sous-Bois, both of France

[73] Assignee: Bendix France, Drancy, France

[21] Appl. No.: 153,169

[22] Filed: Feb. 8, 1988

[30] Foreign Application Priority Data

Feb. 12, 1987 [FR] France ................. 87 01758

[51] Int. Cl.$^4$ ............ F16D 51/52; F16D 65/54; F16D 65/64; F16D 51/20
[52] U.S. Cl. .................. 188/79.52; 188/196 B; 188/79.55; 192/111 A
[58] Field of Search .............. 188/79.52, 196 All, 188/325–343, 79.51–79.64; 192/111 A

[56] References Cited

U.S. PATENT DOCUMENTS

| 2,147,996 | 2/1939 | Smith | 188/79.52 |
|---|---|---|---|
| 2,165,076 | 7/1939 | Smith | 188/79.52 |
| 2,292,018 | 8/1942 | Smith | 188/79.52 |
| 2,570,398 | 10/1951 | Smith | 188/79.52 |
| 3,339,678 | 9/1967 | Burnett | 188/79.5 |
| 3,983,970 | 10/1976 | Courbot | 188/79.5 B |
| 4,476,963 | 10/1984 | Palmer et al. | 188/79.52 |
| 4,558,766 | 12/1985 | Palmer et al. | 188/196 BA X |
| 4,595,082 | 6/1986 | LeDeit | 188/196 B X |
| 4,706,783 | 11/1987 | Rath et al. | 188/79.52 |
| 4,706,784 | 11/1987 | Shellhouse | 188/79.52 |
| 4,729,457 | 3/1988 | Cousin et al. | 188/79.52 |

FOREIGN PATENT DOCUMENTS

| 935316 | 6/1948 | France . |
|---|---|---|
| 1419377 | 10/1965 | France . |
| 2285545 | 4/1976 | France . |
| 549914 | 12/1942 | United Kingdom . |
| 1507550 | 4/1978 | United Kingdom . |

Primary Examiner—Douglas C. Butler
Attorney, Agent, or Firm—Larry J. Palguta; Ken C. Decker

[57] ABSTRACT

The automatic adjustment of a drum brake, when the wear of the friction linings carried by the shoes justifies it, is obtained by way of an adjusting lever (30) mounted pivotally on one (12a) of the shoes and carrying a toothed quadrant (30a), on which a pawl (34) is normally engaged. A spacer connecting the ends of the shoes between which the brake motor is located interacts with the adjusting lever by way of a connection with play. To prevent inopportune adjustment as a result of heating of the drum, a blocking member (52) carried by a metallic strip (50) fastened to the pivot pin (36) of the pawl (34) immobilizes the latter in terms of rotation when the temperature exceeds a certain threshold, thus increasing the functional play.

2 Claims, 2 Drawing Sheets

U.S. Patent   Feb. 14, 1989   Sheet 1 of 2   4,804,072
FIG. 1
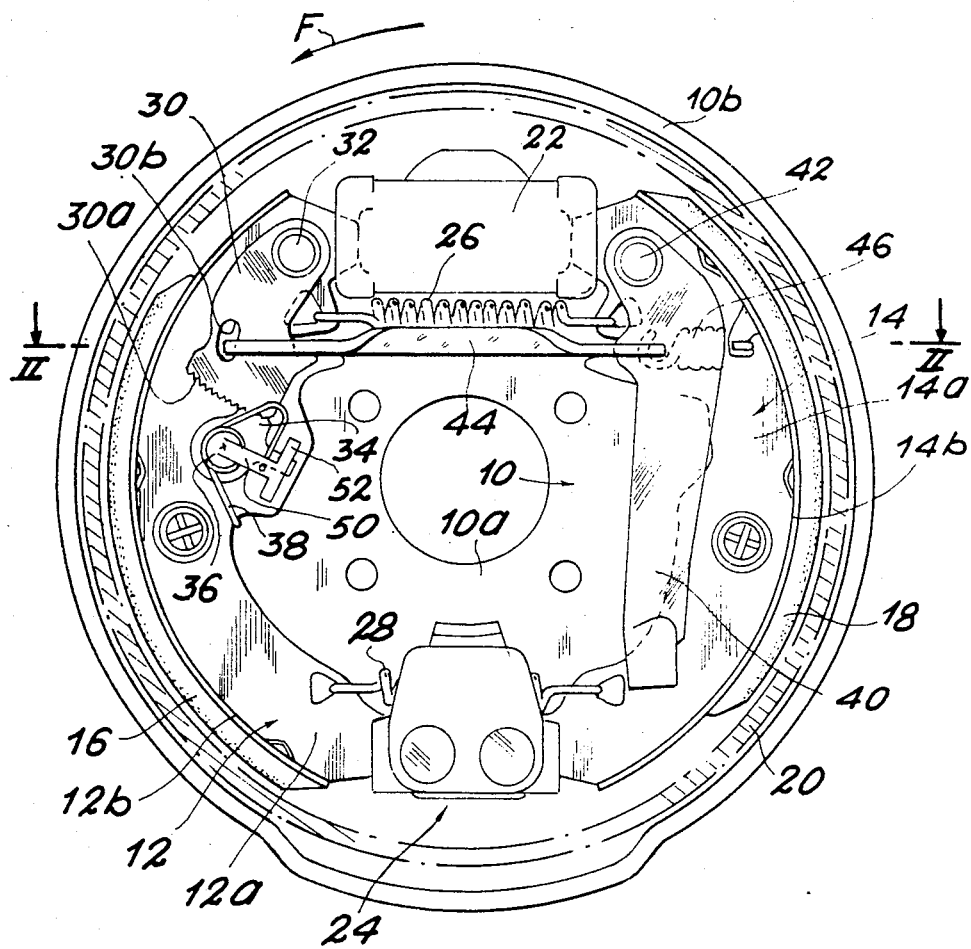
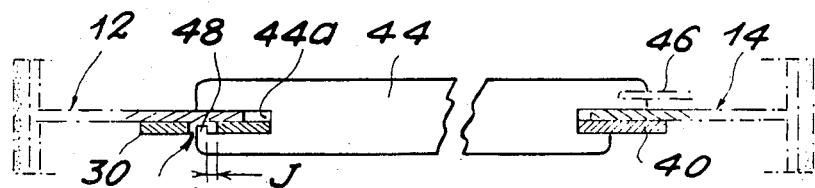
FIG. 2

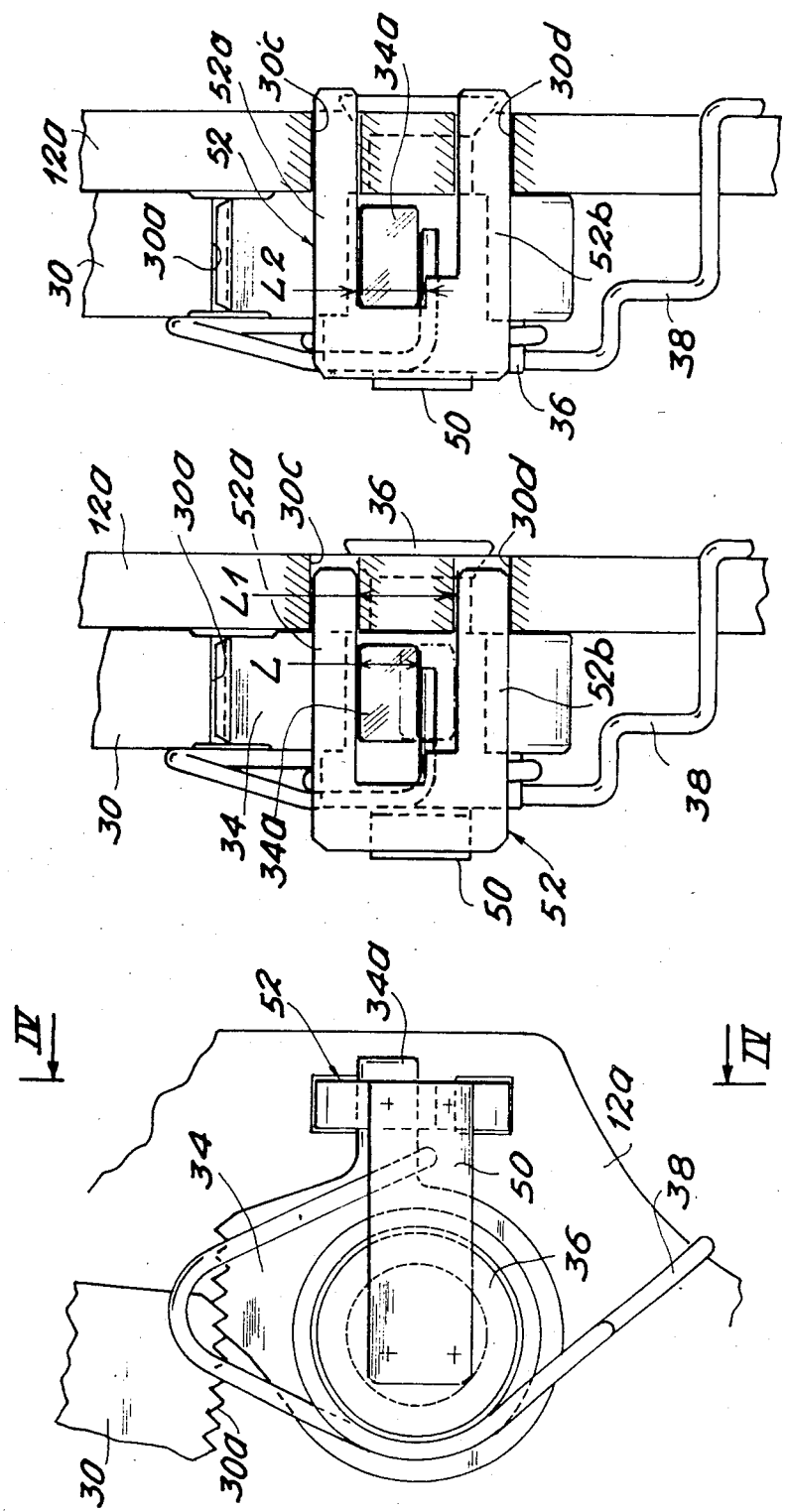

DRUM BRAKE WITH AUTOMATIC ADJUSTMENT LOCKED AT HIGH TEMPERATURE

DESCRIPTION

The invention relates to a drum brake equipped with an automatic adjustment device which allows for the wear of the friction elements of the brake so that the stroke of the brake motor remains virtually unchanged in spite of this wear. Such a brake can be used equally either on a passenger car or on a heavy-goods vehicle.

More specifically, the invention relates to a drum brake, such as that described in the document FR-A-1,419,377. This drum brake comprises a support plate, on which two shoes possessing friction elements are slidably mounted. These elements are capable of being brought into frictional engagement against a rotating drum by means of a brake motor interposed between two adjacent ends of the shoes. An adjusting lever is atriculated, at one of its ends, near the brake motor on a first shoe and at its opposite end has a toothed quadrant. A pawl mounted on this same shoe is engaged on the toothed quadrant, formed at the end of the adjusting lever, under the action of a torsion spring.

The drum brake described in the document FR-A-1,419,377 also possesses a spacer interposed between the shoes near the brake motor and a spring stressing the ends of the shoes towards the spacer, so as to bring the adjusting lever up against the latter when the brake motor is not actuated. This defines a spacing distance at rest between the above-mentioned ends of the shoes. The interaction of the pawl with the toothed quadrant formed at the end of the adjusting lever is such that the latter is allowed to rotate only in the direction tending to increase this spacing distance at rest. In order to control this rotation of the adjusting lever when the wear of thefriction elements makes it necessary to increase this spacing distance at rest, the spacer and the adjusting lever interact with one another via a connection which has a certain functional play.

In a brake of this type, the distance separating the ends of the shoes between which the brake motor is located, when the latter is not actuated, is increased automtaically when the actuating stroke of the brake motor necessary for laying the friction elements against the drum exceeds a certain value. The wear of the friction elements is thus compensated automatically.

However, because there are no special arrangements, the spacing which, at rest, separates the ends of the shoes between which the brake motor is located is also increased automatically when an increase in the actuating stroke of the brake motor is the result of substantial heating. In fact, the expansion of the drum is such that the increase in the actuating stroke of the brake motor causes a pivoting of the adjusting lever. This results in an inopportune movement of the shoes away from one another, risking leading to a locking of the brake when the temperature of the latter returns to normal.

The specific subject of the invention is a drum brake of the type defined above, this brake being equipped with suitable means taking it possible to prevent heating from causing an increase in the distance which, at rest, separates the ends of the shoes between which the brake motor is located.

According to the invention, this result is obtained by means of adrum brake with automatic adjustment, comprising a support plate, on which are slidably mounted two shoes having friction elements capable of being brought into frictional engagement against a rotating drum by means of a brake motor interposed between two adjacent ends of the shoes, an adjusting lever, one end of which is articulated on the end of a first shoe, a spacer interposed between the shoes near the brake motor, an elastic means stressing the ends of the shoes towards the spacer, so as to bring the adjusting lever up against the latter when the brake motor is not actuated, in order to define a spacing distance at rest between the ends of the shoes, and a pawl mounted on the first shoe and stressed elastically against a toothed quadrant formed at the other end of the adjusting lever, so as to allow the latter to rotate only in a direction tending to increase this spacing distance at rest, the spacer and the adjusting lever interacting with one another via a connection defining a functional play when the brake motor is not actuated, this connection being capable of controlling the rotation of the adjusting lever in the said direction when the motor is actuated, characterized in that a blocking member carried by a temperture-sensitive member immobilizes the pawl against the toothed quadrant when the temperature is higher than a given temperature threshold.

In the improved drum brake thus defined, the pawl can tilt normally to allow the adjustment of the brake when the temperature is below a certain threshold. In contrast, the immobilisation of the pawl by means of the blocking member at temperatures higher than the above-mentioned threshold makes it possible to prevent inopportune adjustment from takin gplace as a result of heating of the brake.

Preferably, the temperture-sensitive member is a bi-metallic strip, and in particular this bimetallic strip can be fastened to the first shoe at a first end and carry the blocking member at its other end.

According to a particular embodiment of the invention, the blocking member is a fork with two prongs straddling a projecting part of the pawl, these prongs defining between them a clearance having two zones of different widths, a first zone of the clearance, of a width slightly greater than the width of the said projecting part, being level with this part when the temperature is higher than the said threshold, and the second zone of the clearance, of a width much greater than the width of the projecting part, being level with this part when the temperature is below the said threshold.

The invention will now be described by wayof example with reference to the accompanying drawings in which:

FIG. 1 is a plan view of a drum brake according to the invention,

FIG. 2 is a sectional view along the line II—II of FIG. 1,

FIG. 3 is a plan view showing, on a larger scale, the pawl interacting with the toothed quadrant of the adjusting lever, and FIGS. 4a and 4b are sectional views along the line IV—IV of FIG. 3, showing the pawl-blocking member in the position which it occupies when the temperature is below and above a given threshold respectively.

The drum brake illustrated in FIG. 1 comprises a support plate 10 consisting of an approximately planar disc 10a extended on its periphery by a circular ring 10b. This plate 10 is intended to be secured to a fixed part of the vehicle, such as an axle flange.

Two brake shoes 12 and 14 are supported slidably by the disc 10a of the support plate via conventional mechanisms (not shown). In a well known way, each of the shoews 12 and 14 comprises an approximately planar core 12a, 14a, to which is fastened a rim 12b, 14b in the form of an arc of a circle, supporting a friction lining 16 and 18 respectively on its outer face.

The shoes 12 and 14 are arranged on the support plate 10, in such a way that the outer envelope of the linings 16 and 18 are located on one and the same circle, the axis of which coincides with the axis of the support plate 10. Thus, the linings 16 and 18 can come in contact with the inner surface of a drum brake 20 covering the two shoes and represented by dot-and-dash lines in FIG. 1. The drum 20 is mounted concentrically within the ring 10b, and it is fastened to a rotating part, such as a wheel of the vehicle.

A hydraulically controlled brake motor 22 is fastened to the disc 10a of the support plate between two first adjacent ends of the shoes 12. This brake motor 22 is equipped with two pistons (not shown) which operate in opposition to one another, so as to exert a thrust on the corresponding end of the core 12a, 14a of each of the shoes when the motor is actuated.

An anchoring block 24, likewise fastened to the disc 10a of the support plte, is arranged between the other two adjacent ends of the shoes 12 and 14, in such a way that the corresponding ends of the cores 12a and 14a of these shoes are normally up against this block.

A draw spring 26 is interposed between the ends of the cores of the shoes between which the brake motor 22 is located, in the immediate vicinity of the latter, in order to bring these ends nearer to one another when the motor is not actuated. In a comparable way, the other two ends of the shoes 12 and 14 are held up against the anchoring block 24 by means of a draw spring 28 interposed between the corresponding ends of the cores of the shoes in the immediate vicinity of this block.

If it is assumed that the brake drum 20 rotates in the direction of the arrow F in FIG. 1 when the vehicle travels forwards, the distinction can be made between the shoes 12 and 14 in that the shoe 12 bears on the anchoring block 24 when it is in frictional contact with the drum, whereas the shoe 14 bears on the brake motor 22 under the same conditions. To take this difference into account, the shoes 12 and 14 are called the "front shoe" and the "rear shoe" respectively.

One of the ends of an adjusting lever 30 is mounted pivotally, by means of a pivot pin 32, on the end of the core of the front shoe 12 which is up against the brake motor 22. The opposite end of the adjusting lever 30 carries a toothed quadrant 30a centered on the pivot pin 32.

A pawl 34 is likewise mounted pivotally, by means of a pivot pin 36, on the core of the front shoe 12, opposite the toothed quadrant 30a. A torsion spring 38 mounted on the pivot pin 36 lays the teeth of the pawl 34 against the teeth of the toothed quandrant 30a. The interaction between the pawl 34 and the toothed quadrant 30a is such that is is possible for the adjusting lever 30 to pivot about its pivot pin 32 in the anti-clockwise direction, as seen in FIG. 1, whereas it is impossible for the lever 30 to pivot in the opposite direction.

In the exemplary embodiment illustrated in FIG. 1, a handbrake lever 40 is mounted pivotally at one of its ends on the end of the core of the rear shoe 14 adjacent to the brake motor 22 by means of a pivot pin 42.

In a known way, the other end of the handbrake lever 40 is intended to be fastened to the end of a manual control cable (not shown).

The drum brake illustrated in FIG. 1 also possesses a spacer 44 arranged between the shoes 12 and 14 near the brake motor 22 and approximately parallel to the axis of the latter. This spacer 44 consists of a plate having two notches at its ends. The core of the front shoe 12 and the adjusting lever 30 are received in one 44a of these notches (FIG. 2), while the core of the rear shoe 14 and the handbrake lever 40 are received in the other notch. Offset portions formed level with the spacer 44 on the inner edge of each of the shoes 12 and 14 make it possible to keep the spacer in place.

The spacer 44 defines the minimum spacing separating the ends of the shoes between which the brake motor 22 is located, when the latter is relaxed. In fact, the spring 26 keeps the adjusting lever 30 and the handbrake lever 40 in the bottom of the notches formed at the ends of the spacer 44, when the brake motor 22 is not actuated. For this purpose, the inner edges of the levers 30 and 40 always project relative to the inner edges of the cores 12a and 14a of the shoes supporting them, in the region of the link 44.

A pivoting of the adjusting lever 30 in the anti-clockwise direction (FIG. 1) therefore tends to increase the distance which, at rest, separtes the ends of the shoes between which the motor 22 is located. By controlling such pivoting when the wear of the linings 16 and 18 so requires, this wear therefore is automatically compensated.

The control of the pivoting of the lever 30 when the brake motor 22 is actuated and when it is necessary to adjust the brake is carried out by means of the spacer 44. For this purpose, a draw spring 46 is interposed between the core 14a of the rear shoe and the end of the spacer 40 adjacent to this shoe, so that the spacer moves, together with the rear shoe 14, when the brake motor 22 is actuated. A relative movement then occurs between the opposite end of the spacer 44 and the adjusting lever 30 carried by the front shoe 12.

As illustrted more specifically in FIG. 2, the effect on this movement is to compensate a functional play J which exists, at rest, between a lug 48 formed on the spacer 44 and a slot 30b which is made in the adjusting lever 30 and into which the lug 48 penetrates.

When the play J existing, at rest, between the lug 48 and the slot 30b is compensated during the actuation of the brake motor 22, the lug 48 comes up against the edge of the slot 30b nearest to the interior of the brake. If the spacing which exists at this moment between the ends of the shoes 12 and 14 actuated by means of the brake motor 22 is not sufficient to lay the linings 16 and 18 against the rotating drum 20 effectively, the stroke of the brake motor 22 continues, the effect of which is to cause the adjusting lever 30 to pivot in the anti-clockwise direction, as seen in FIG. 1. When this pivoting allows the pawl 34 to advance one tooth on the toothed quadrant 30a, the spacing which exists, at rest, between the ends of the shoes adjacent to the brake motor 22 is increased.

According to the invention, means are provided for immobilizing the pawl 34 in its position, in which it is engaged on the toothed quadrant 30a of the adjusting lever, when the temperature is higher than a threshold determined byvirtue of construction. An inopportune increase in the distance which, at rest, separates the ends of the shoes between which the brake motor 22 is located, resulting from an expansion of the brake drum, is prevented in this way.

In the embodiment illustrated in FIGS. 3, 4a and 4b, these means comprise a bimetallic srip 50, one end of which is fastened, for example by welding, to one end of the rivet forming the pivot pin 36 of the pawl 34. More specifically, the rivet is fixed to the core 12a of the front shoe 12 at one of its ends, and at its opposite end it carries the bimetallic strip 50, in such a way that the bimetallic strip is approximately parallel to the core of the shoe 12.

A blocking member 52 is fastened, likewise by welding, to the opposite end of the bimetallic strip 50. This blocking member 52 has the form of a U-shaped fork fastened to the bimetallic strip in its central part. The two prongs 52a and 52b of this fork are oriented in a direction parallel to the pivot pin 36, towards the core 12a of the front shoe 12, as shown clearly in FIGS. 4a and 4b. The ends of these prongs 52a and 52b penetrate into matching holes 30c and 30d extending through the core of the front shoe 12. The interaction between the ends of the prongs 52a and 52b and the holes 30c and 30d is such that the prongs can move parallel to the pivot pin 36, while at the same time being held laterally in these holes.

The prongs 52a and 52b of the blocking member 52 define between them a clearance having two zones of different widths. Over most of the length of the prongs up to the free end of these, this width has a relatively high value $L_1$ (FIG. 4a). On the contrary, near the central part of the member 52, the width of the clearance between the prongs has a lower value $L_2$ (FIG. 4b), obtained by means of an offset portion formed on the prong 52b furthest away from the adjusting lever 30.

The pawl 34 has a rectangular projecting part 34a directed radially relative toits pivot pin 36. This projecting part 34a passes between the prongs 52a and 52b of the blocking member, in such a way that its face turned towards the adjusting lever 30 is very near the straight prong 52a of the blocking member 52 when the pawl is engaged on the toothed quadrant 30a. As shown in FIGS. 4a and 4b, the width L of the projecting part 34a between the prongs 52a and 52b of the blocking member is very slightly less than the width $L_2$ and very much less than the width $L_1$.

FIG. 4a illustrates the position of the blocking member 52 when the ambient temperature is below a certain threshold, for example in the region of 250° C. Under these conditions, the bimetallic strip 50 is hardly deformed at all and the projecting part 34a of the pawl is in the zone of greater width $L_1$ of the clearance formed between the prongs 52a and 52b of the blocking member. When it is necessary to adjust the brake, the pawl 34 can then pivot, as indicated by dot-and-dash lines in FIG. 4a, in order tojump over a tooth on the toothed quadrant 30a of the adjusting lever 30.

On the contrary, FIG. 4b shows that when the ambient temperature exceeds the abovementioned threshold the projecting part 34a of the pawl is located partially in the zone of smaller width $L_2$ of the clearance defined between the two prongs of the blocking member 52. Any pivoting of the pawl 34 about its pivot pin 36 is then prevented, with the result tht it is not possible for the adjusting lever to rotate. Inopportune adjustment of the brake attributable to heating is therefore impossible.

Of course, the embodiment which has just been described can undergo various modifications, without departing from the scope of the invention. Thus, the bimetallic strip carrying the blocking member could be fastened directly to the shoe, on which the pawl is mounted. The blocking member can also take a different form, in particular that of a rod which can penetrte into a hole made in the pawl when the temperature exceeds the abovementioned threshold.

We claim:

1. A drum brake with automatic adjustment, comprising a support plate on which is slidably mounted first and second brake shoes having friction elements capable of being brought into fricitonal engagement against a rotating drum by means of a brake motor interposed between two adjacent ends of the shoes, an adjusting lever one end of which is articulated on the end of the first brake shoe, a spacer interposed between the shoes and near the brake motor, first elastic means stressing the ends of the shoes toward the spacer so as to bring the adjusting lever against the spacer when the brake motor is not actuated in order to define a spacing distance at rest between the ends of the shoes, and a pawl mounted on the first brake shoe and stressed elastically against a toothed quadrant formed at the other end of the adjusting lever so as to allow the adjusting lever to rotate only in a direction tending to increase the spacing distance at rest, the spacer and adjusting lever interacting with one another via a connection defining a functional play when the brake motor is not actuated, the connection capable of controlling the rotation of the adjusting lever in said direction when the motor is actuated, characterized in that a blocking member carried by a temperature-sensitive member immobilizes the pawl against the toothed quadrant when the temperature is higher than a given temperature threshold, the temperature-sensitive member comprising a bimetallic strip connected with the first brake shoe at a first end and carrying the blocking member at a second end, the blocking member comprising a fork with two prongs straddling a projecting part of the pawl, the prongs defining therebetween a clearance having two zones of different width, a first zone of the clearance having a width slightly greater than a width of the projecting part and being aligned with the projecting part when the temperature is higher than the threshold, and the second zone fo the clearance having a width much greater than the width of the projecting part and being aligned with the projecting part when the temperature is below the threshold.

2. The drum brake according to claim 1, characterized in that ends of the prongs of the blocking member are guided in matching holes made in the first brake shoe.

* * * * *